United States Patent
Jao et al.

(10) Patent No.: US 9,810,968 B2
(45) Date of Patent: Nov. 7, 2017

(54) WAVELENGTH CONVERSION DEVICE AND PROJECTOR

(71) Applicant: Coretronic Corporation, Hsin-Chu (TW)

(72) Inventors: Kun-Liang Jao, Hsin-Chu (TW); Ko-Shun Chen, Hsin-Chu (TW); Chi-Hsun Wang, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 62 days.

(21) Appl. No.: 14/753,024

(22) Filed: Jun. 29, 2015

(65) Prior Publication Data

US 2016/0004138 A1    Jan. 7, 2016

(30) Foreign Application Priority Data

Jul. 1, 2014   (CN) .......................... 2014 1 0308636

(51) Int. Cl.
  *G03B 21/20*   (2006.01)
  *G02F 1/35*    (2006.01)
  *G03B 33/08*   (2006.01)

(52) U.S. Cl.
  CPC ......... *G02F 1/3532* (2013.01); *G03B 21/204* (2013.01); *G03B 33/08* (2013.01)

(58) Field of Classification Search
  CPC ........... G02F 1/35; G03B 21/14; G03B 21/20; G03B 21/00; F21S 2/00; F21V 17/00; F21V 9/08; F21V 9/10; F21V 9/16
  See application file for complete search history.

(56) References Cited

U.S. PATENT DOCUMENTS

| | | |
|---|---|---|
| 6,963,457 B1 | 11/2005 | Niwa et al. |
| 8,157,398 B2 | 4/2012 | Yamamoto |
| 2009/0273763 A1 | 11/2009 | Kjaer |

FOREIGN PATENT DOCUMENTS

| | | |
|---|---|---|
| CN | 2488080 Y | 4/2002 |
| CN | 1462906 A | 12/2003 |
| CN | 2590041 Y | 12/2003 |
| JP | 2007094215 | 4/2007 |
| JP | 2010237443 | 10/2010 |
| JP | 2011070882 | 4/2011 |
| JP | 2011070882 A * | 4/2011 |

(Continued)

OTHER PUBLICATIONS

"Office Action of Japan Counterpart Application", dated Feb. 23, 2016, p. 1-p. 4, in which the listed references were cited.

(Continued)

Primary Examiner — Sultan Chowdhury
Assistant Examiner — Danell L Owens
(74) Attorney, Agent, or Firm — JCIPRNET

(57) ABSTRACT

A wavelength conversion device including a main body and a transparent element is provided. The main body has at least one wavelength conversion region, a containing recess portion, and a stop portion. The containing recess portion and the stop portion encircle a closed slot. The transparent element is disposed in the closed slot to construct a light penetration region. The stop portion stops the transparent element along a radial direction of the main body. Moreover, a projector using the wavelength conversion device is also mentioned.

20 Claims, 5 Drawing Sheets

(56) References Cited

FOREIGN PATENT DOCUMENTS

| | | |
|---|---|---|
| JP | 2011113071 | 6/2011 |
| JP | 2011133784 | 7/2011 |
| JP | 2011197594 | 10/2011 |
| JP | 2012068528 | 4/2012 |
| WO | 2014073136 | 5/2014 |

OTHER PUBLICATIONS

"Office Action of Japan Counterpart Application", dated Sep. 13, 2016, p. 1-p. 5, in which the listed reference as cited.
"Office Action of China Counterpart Application", dated Aug. 15, 2016, p. 1-p. 7, in which the listed references were cited.

* cited by examiner

WAVELENGTH CONVERSION DEVICE AND PROJECTOR

CROSS-REFERENCE TO RELATED APPLICATION

This application claims the priority benefit of China application serial No. 201410308636.2, filed on Jul. 1, 2014. The entirety of the above-mentioned patent application is hereby incorporated by reference herein and made a part of this specification.

BACKGROUND

Technical Field

The invention relates to an optical device and a display apparatus having the optical device, and particularly relates to a wavelength conversion device and a projector using the wavelength conversion device.

Related Art

In recent years, projectors using solid-state light sources such as light-emitting diodes (LEDs) and laser diodes gradually occupy a space in the market. Since the LEDs have light efficiency of higher than 20%, in order to break through a light source limitation of the LED, a technique of using a laser light source to excite phosphor powder to produce a pure color light source required by the projector is gradually developed. Moreover, besides using the laser light source to excite the phosphor powder to emit light, the laser projector also directly uses the laser light source to serve as an illumination light source, and the laser projector is capable of adjusting the number of the light sources according to a brightness requirement, so as to achieve different brightness requirements of the projectors. Therefore, the laser light source used by a light source system of the projector structure has a great potential to replace the conventional high pressure mercury lamp to become light sources of mainstream projectors of a new generation.

In a present laser projector, the phosphor powder is generally coated on a metal substrate with a high reflectivity to form a phosphor wheel, and the phosphor powder on the metal substrate is excited by the laser light emitted by the laser light source to generate lights with different colors (for example, a green light and a yellow light), and the laser light (for example, a blue light) directly passes through the phosphor wheel through a hollow slot on the metal substrate, so as to generate lights of various colors. Under such design, when the metal substrate rotates, an airborne noise is generated due to configuration of the hollow slot. Moreover, in order to avoid asymmetric structure of the metal substrate caused by the hollow slot to cause excessive wobble of the metal substrate during rotation of the metal substrate, some metal substrates of the phosphor wheel are added with another hollow slot to symmetrize the structure of the metal substrate, though such method aggravates the airborne noise, and a heat dissipation area of the metal substrate is decreased to degrade a heat dissipation efficiency of the phosphor wheel.

U.S. Pat. No. 8,157,398 discloses a light radiation wheel applied to a projector, the light radiation wheel includes an opaque substrate and a transparent diffusion substrate adjacent to each other, a blue excitation beam emitted by a light emitter excites the phosphor powder on the opaque substrate or directly penetrates through the diffusion substrate. U.S. Patent Publication No. 20090273763 discloses a color wheel, on which one end of a filter sheet is fixed between a protruding spring and a protruding board of the color wheel. U.S. Pat. No. 6,963,457 discloses a color wheel, in which a center portion of one block thereof has a plurality of indentations for fitting the other blocks of the color wheel.

The information disclosed in this "BACKGROUND" section is only for enhancement of understanding of the background of the described technology and therefore it may contain information that does not form the prior art that is already known to a person of ordinary skill in the art. Further, the information disclosed in this "BACKGROUND" section does not mean that one or more problems to be solved by one or more embodiments of the invention was acknowledged by a person of ordinary skill in the art.

SUMMARY

The invention is directed to a wavelength conversion device, which avoids an airborne noise during operation, and has better heat dissipation efficiency.

Other objects and advantages of the invention can be further illustrated by the technical features broadly embodied and described as follows.

In order to achieve one or a portion of or all of the objects or other objects, an embodiment of the invention provides a wavelength conversion device including a main body and a transparent element. The main body has at least one wavelength conversion region, a containing recess portion, and a stop portion, and the containing recess portion and the stop portion encircle a closed slot. The transparent element is disposed in the closed slot to construct a light penetration region, and the stop portion stops the transparent element along a radial direction of the main body.

In an embodiment of the wavelength conversion device of the invention, a distance between an outer periphery of the stop portion and a center of the main body along the radial direction is greater than a distance between an outer periphery of the wavelength conversion region and the center of the main body along the radial direction.

In an embodiment of the wavelength conversion device of the invention, one of the containing recess portion and the transparent element has at least one indentation, and another one of the containing recess portion and the transparent element has at least one bump. The bump is stuck into the indentation to fix a relative position of the transparent element and the main body.

In an embodiment of the wavelength conversion device of the invention, the bump is stuck into the indentation to prevent the transparent element from moving away from the main body along the radial direction.

In an embodiment of the wavelength conversion device of the invention, the main body has a retaining structure. The retaining structure is located in the containing recess portion. The transparent element leans against the retaining structure to prevent the transparent element from moving away from the main body along an axial direction of the main body, and the axial direction is perpendicular to the radial direction.

In an embodiment of the wavelength conversion device of the invention, the wavelength conversion device further includes an assembly. The assembly is disposed on the main body, and the transparent element is clamped between the assembly and the retaining structure.

In an embodiment of the wavelength conversion device of the invention, the retaining structure includes at least one flange, and the flange is connected to at least one inner wall of the containing recess portion.

In an embodiment of the wavelength conversion device of the invention, the retaining structure includes a plate connected between a plurality of the inner walls of the containing recess portion.

In an embodiment of the wavelength conversion device of the invention, a first portion of the transparent element leans against the retaining structure, and a second portion of the transparent element is exposed by the retaining structure to construct the light penetration region.

In an embodiment of the wavelength conversion device of the invention, a sum of thickness of the retaining structure and the transparent element along the axial direction is equal to a thickness of the main body along the axial direction.

In order to achieve one or a portion of or all of the objects or other objects, an embodiment of the invention provides a projector including a light source, a light valve, a lens, and a wavelength conversion device. The light source is adapted to provide an illumination beam. The light valve is located on a transmission path of the illumination beam, and is adapted to convert the illumination beam into an image beam. The lens is located on a transmission path of the image beam, and is adapted to convert the image beam into a projection beam. The wavelength conversion device is disposed on the transmission path of the illumination beam, and includes a main body and a transparent element. The main body has at least one wavelength conversion region, a containing recess portion, and a stop portion, and the containing recess portion and the stop portion encircle a closed slot. The transparent element is disposed in the closed slot to construct a light penetration region. The main body is adapted to move to sequentially move the wavelength conversion region and the light penetration region to the transmission path of the illumination beam, and the stop portion stops the transparent element along a radial direction of the main body.

In an embodiment of the projector of the invention, a distance between an outer periphery of the stop portion and a center of the main body along the radial direction is greater than a distance between an outer periphery of the wavelength conversion region and the center of the main body along the radial direction.

In an embodiment of the projector of the invention, one of the containing recess portion and the transparent element has at least one indentation, and another one of the containing recess portion and the transparent element has at least one bump. The bump is stuck into the indentation to fix a relative position of the transparent element and the main body.

In an embodiment of the projector of the invention, the bump is stuck into the indentation to prevent the transparent element from moving away from the main body along the radial direction.

In an embodiment of the projector of the invention, the main body has a retaining structure. The retaining structure is located in the containing recess portion. The transparent element leans against the retaining structure to prevent the transparent element from moving away from the main body along an axial direction of the main body, and the axial direction is perpendicular to the radial direction.

In an embodiment of the projector of the invention, the wavelength conversion device further includes an assembly. The assembly is disposed on the main body, and the transparent element is clamped between the assembly and the retaining structure.

In an embodiment of the projector of the invention, the retaining structure includes at least one flange, and the flange is connected to at least one inner wall of the containing recess portion.

In an embodiment of the projector of the invention, the retaining structure includes a plate connected between a plurality of the inner walls of the containing recess portion.

In an embodiment of the projector of the invention, a first portion of the transparent element leans against the retaining structure, and a second portion of the transparent element is exposed by the retaining structure to construct the light penetration region.

In an embodiment of the projector of the invention, a sum of thickness of the retaining structure and the transparent element along the axial direction is equal to a thickness of the main body along the axial direction.

According to the above descriptions, the embodiments of the invention have at least one following advantages. In the embodiments of the invention, the transparent element is disposed in the closed slot encircled by the containing recess portion and the stop portion, such that the closed slot is covered by the transparent element to avoid generating the airborne noise when the main body is operated. Since the transparent element is disposed in the closed slot so that the main body and the transparent element construct a disk-like structure, a problem of asymmetric structure caused by configuring an open slot or closed slot on the wavelength conversion device is mitigated, and it is unnecessary to add another open slot or closed slot on the main body to resolve the problem of the asymmetric structure, such that fabrication cost of the wavelength conversion device is decreased and it is avoided to form excessive open slots or closed slots on the main body to aggravate the airborne noise. Moreover, since the main body of the wavelength conversion device is unnecessary to additionally add the open slot or closed slot, the main body has a larger heat dissipation area, and the wavelength conversion device accordingly has good heat dissipation efficiency. In addition, the stop portion of the embodiment of the invention stops the transparent element along a radial direction of the main body, such that the transparent element is prevented from separating away from the main body along the radial direction along with movement of the main body, and the whole structure of the wavelength conversion device is more stable.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional tell sinology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
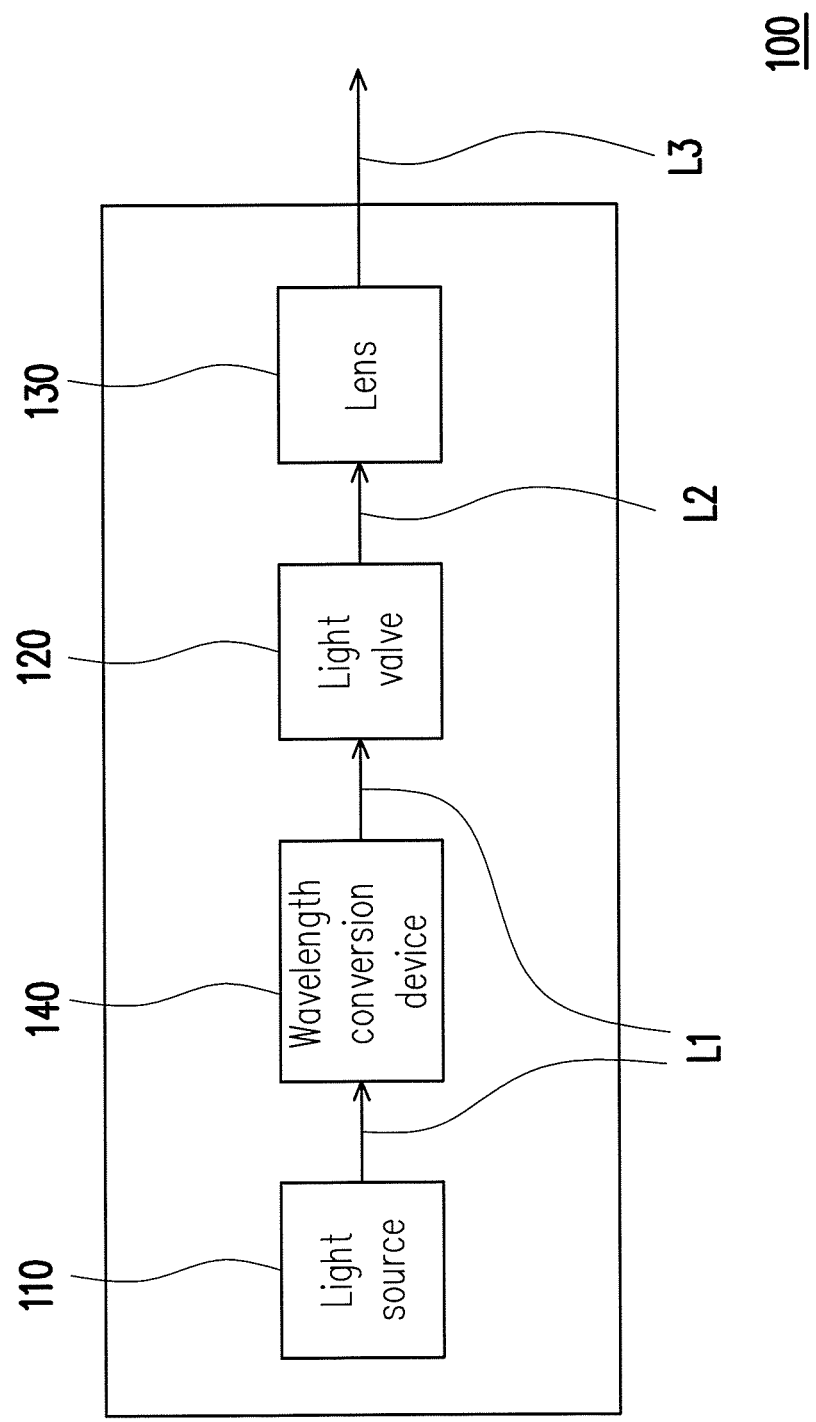
FIG. 1 is a schematic diagram of a part of components of a projector according to an embodiment of the invention.

Referring to FIG. 1, the projector 100 of the embodiment includes a light source 110, a light valve 120, a lens 130, and a wavelength conversion device 140. The light source 110 is adapted to provide an illumination beam L1. The light valve 120 is located on a transmission path of the illumination beam L1, and is adapted to convert the illumination beam L1 into an image beam L2. The lens 130 is located on a transmission path of the image beam L2, and is adapted to convert the image beam L2 into a projection beam L3. The wavelength conversion device 140 is disposed on the transmission path of the illumination beam L1. For example, the light source 110 is, for example, a laser light source and is adapted to emit a blue laser light (i.e., the illumination beam L1). The wavelength conversion device 140 is a, for example, a phosphor wheel, and different phosphor powders are disposed thereon, and the laser light (i.e., the illumination beam L1) excites the phosphor powders to generate beams with different colors, which is described in detail below.

Figure 2:
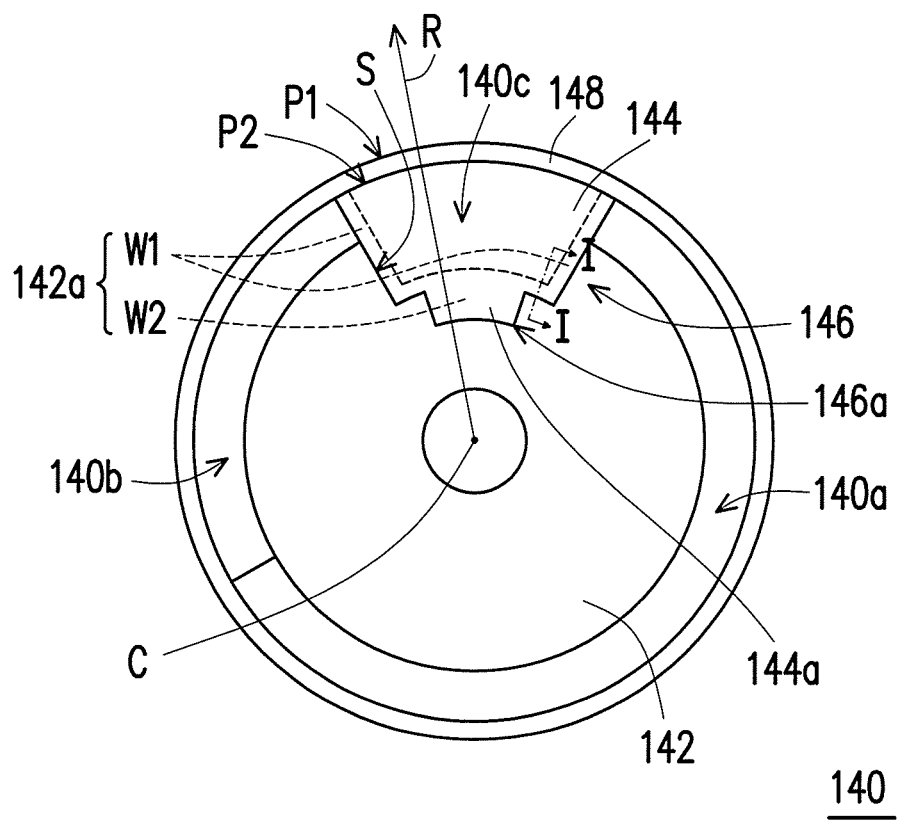
FIG. 2 is a side view of a part of components of the wavelength conversion device of FIG. 1.

Referring to FIG. 2, the wavelength conversion device 140 of the embodiment includes a main body 142 and a transparent element 144. The main body 142 is, for example, a metal substrate, and the main body 142 is configured with at least one wavelength conversion region. In the embodiment, the main body 142 has two wavelength conversion regions 140a and 140b, and the main body 142 further has a containing recess portion 146 and a stop portion 148. The containing recess portion 146 and the stop portion 148 encircle a closed slot S. A material of the main body 142 is, for example, aluminium or other suitable metal materials having high thermal conductivity for reflecting light beam. The wavelength conversion region 140a and the wavelength conversion region 140b are respectively coated with the phosphor powders having different colors for converting the blue laser light into color lights having different wavelengths, and the transparent element 144 is disposed in the closed slot S of the main body 142 to construct a light penetration region 140c. A material of the transparent element 144 is, for example, glass, and light transmittance thereof is, for example, about 95%. The transparent element 144 may be coated with an anti-reflection layer to improve the light transmittance of the transparent element 144, such that the light transmittance of the transparent element 144 is, for example, greater than 98%.

Figure 3:
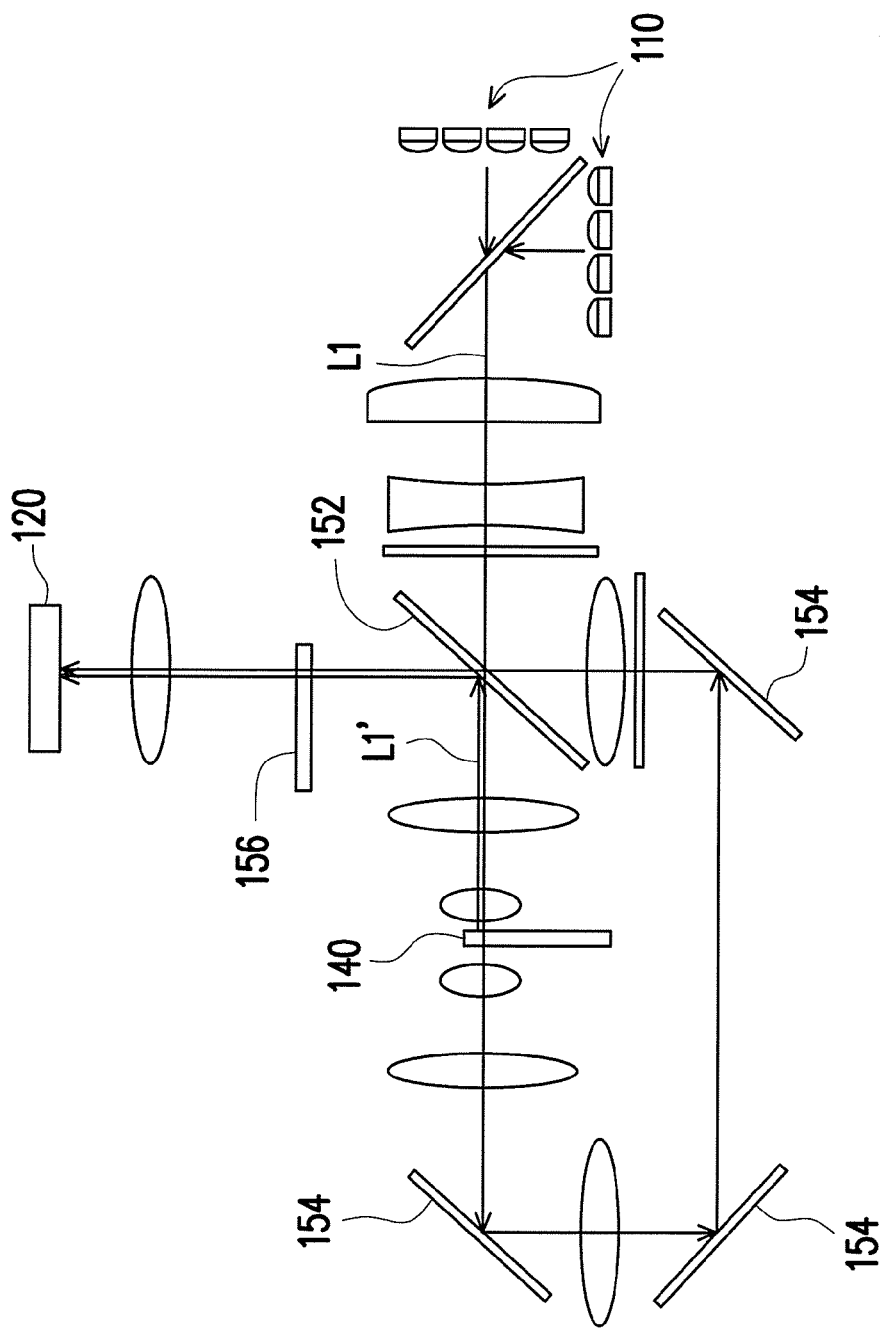
FIG. 3 is a schematic diagram of a part of components of the projector of FIG. 1.

Referring to FIG. 2 and FIG. 3, the illumination beam L1 (the blue laser light) provided by the light source 110 is adapted to penetrate through a dichroic mirror 152 to reach the wavelength conversion device 140, and the main body 142 of the wavelength conversion device 140 is adapted to rotate along a rotation axis (not shown) served as a center to render the wavelength conversion region 140a, the wavelength conversion region 140b, and the light penetration region 140c sequentially rotate to the transmission path of the illumination beam L1. When the wavelength conversion region 140a or the wavelength conversion region 140b is moved to the transmission path of the illumination beam L1, the illumination beam L1 excites the phosphor powder on the wavelength conversion region 140a or the phosphor powder on the wavelength conversion region 140b to generate an illumination beam L1' with different colors (for example, a green beam or a yellow beam), and the excited illumination beam L1' is reflected back to the dichroic minor 152 by the main body 142 as well as reflected by the dichroic mirror 152 and transmitted to the light valve 120. On the other hand, when the light penetration region 140c of the wavelength conversion device 140 is rotated to the transmission path of the illumination beam L1, the illumination beam L1 directly passes through the transparent element 144 as well as is reflected by a plurality of reflectors 154 to guide to the dichroic mirror 152. Then, the illumination beam L1 passes through the dichroic minor 152 and is transmitted to the light valve 120. In this way, illumination beams with different colors may be provided to the light valve 120. In the embodiment, a color filter wheel 156 is further disposed between the dichroic minor 152 and the light valve 120, and the illumination beam L1 (the blue laser light) passing through the transparent element 144 and the illumination beam L1' (the green beam or the yellow beam) are filtered by the color filter wheel 156 to generate various color lights of red light, green light, yellow light, blue light, etc. for providing to the light valve 120.

Referring to FIG. 2, in the embodiment, the closed slot S of the main body 142 is, for example, a sector-shape slot, and a shape of the transparent element 144 is substantially the same to the sector-shape of the closed slot S. Therefore, when the transparent element 144 is configured to the closed slot S, the transparent element 144 may completely cover the sector-shape slot, such that the main body 142 and the transparent element 144 form an integral disk-like structure. Under the above configuration, by disposing the transparent element 144 in the closed slot S of the main body 142, the closed slot S is completely covered by the transparent element 144 to avoid generating the airborne noise when the main body 142 rotates. Since the transparent element 144 is disposed in the closed slot S, a problem of asymmetric structure of the wavelength conversion device 140 due to configuration of the closed slot S may be mitigated, so that it is unnecessary to additionally add another closed slot or open slot on the main body 142 in order to resolve the problem of asymmetric structure, so as to save the fabrication cost of the wavelength conversion device 140 and avoid aggravating the airborne noise due to excessive closed slots or open slots fainted on the main body 142. Moreover, since it is unnecessary to additionally add the open slot or closed slot on the main body 142 of the wavelength conversion device 140, the main body 142 may have larger heat dissipation area and the wavelength conversion device 140 accordingly has good heat dissipation efficiency. Further, the phosphor powders coated on the wavelength conversion region 140a and the wavelength conversion region 140b of the main body 142 are, for example, blended with silicone. By improving the heat dissipation efficiency of the wavelength conversion device 140 through the aforementioned method, decrease of the conversion efficiency when the phosphor powder is excited due to overheat deterioration of the silicone is effectively avoided.

As shown in FIG. 2, a distance between an outer periphery P1 of the stop portion 148 and a center C of the main body 142 along a radial direction R of the main body 142 is greater than a distance between an outer periphery P2 of the wavelength conversion region 140c and the center C of the main body 142 along the radial direction R. The stop portion 148 stops the transparent element 144 along the radial direction R, so as to prevent the transparent element 144 from separating from the main body 142 along the radial direction R along with movement of the main body 142, and the whole structure of the wavelength conversion device 140 may be more stable.

Figure 4:
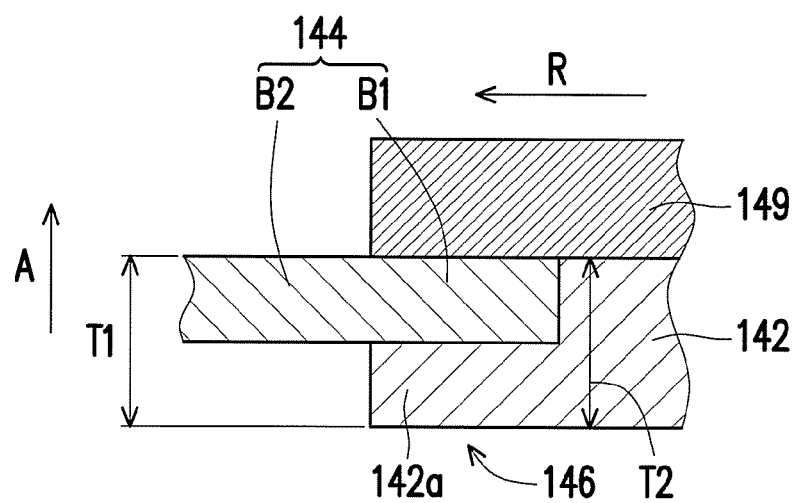
FIG. 4 is a cross-sectional view of the wavelength conversion device of FIG. 2 along an I-I line.

For the sake of clarity, an assembly 149 of FIG. 4 is not illustrated in FIG. 2. Referring to FIG. 2 and FIG. 4, the main body 142 of the embodiment has a retaining structure 142a, the retaining structure 142a is located in the containing recess portion 146. A first portion B1 (shown in FIG. 4) of the transparent element 144 leans against the retaining structure 142a, and a second portion B2 (shown in FIG. 4) of the transparent element 144 is exposed by the retaining structure 142a to construct the light penetration region 140c. The transparent element 144 leans against the retaining structure 142a to prevent the transparent element 144 from separating from the main body 142 along an axial direction A of the main body 142, and the axial direction A is perpendicular to the radial direction R.

In detail, as shown in FIG. 2, the retaining structure 142a of the embodiment includes at least one flange W1 (two flanges, for example, are illustrated) and a plate W2. The flanges W1 are respectively connected to two inner walls of the containing recess portion 146, the plate W2 is connected between a plurality of the inner walls of the containing recess portion 146, and the transparent element 144 leans against the flanges W1 and the plate W2. Implementation the disposition manner of the retaining structure is not limited by the invention, and other suitable configuration for the retaining structure is also applicable besides the configuration of the aforementioned flanges and the aforementioned plate.

Referring to FIG. 4, in the embodiment, a thickness summation T1 of the retaining structure 142a and the transparent element 144 along the axial direction A is equal to a thickness T2 of the main body 142 along the axial direction A, such that the transparent element 144 leaning against the retaining structure 142a may be coplanar with the main body 142, and the whole structure of the wavelength conversion device 140 is more smooth. Moreover, the wavelength conversion device 140 of the embodiment further includes the assembly 149 (shown in FIG. 4). The assembly 149 is disposed on the main body 142, and a part of the transparent element 144 is clamped between the assembly 149 and the retaining structure 142a, such that the whole structure of the wavelength conversion device 140 may be more stable. In the embodiment, the assembly 149 is, for example, a counter weight, which is used for reducing a wobbling degree of the main body 142 when the main body 142 rotates. In other embodiments, the transparent element may be clamped between other suitable members or structures having other configuration(s), which is not limited by the invention.

Referring to FIG. 2, the containing recess portion 146 of the embodiment has at least one indentation 146a (one indentation, for example, is illustrated), and the transparent element 144 has at least one bump 144a (one bump, for example, is illustrated). The bump 144a is stuck into the indentation 146a to fix a relative position of the transparent element 144 and the main body 142, such that the transparent element 144 may be more stably combined with the main body 142. In other embodiments, positions of the bump and the indentation may be exchanged. In brief, the bump is changed to be formed on the containing recess portion and the indentation is changed to be formed on the transparent element in other embodiments, which is not limited by the invention.

Figure 5:
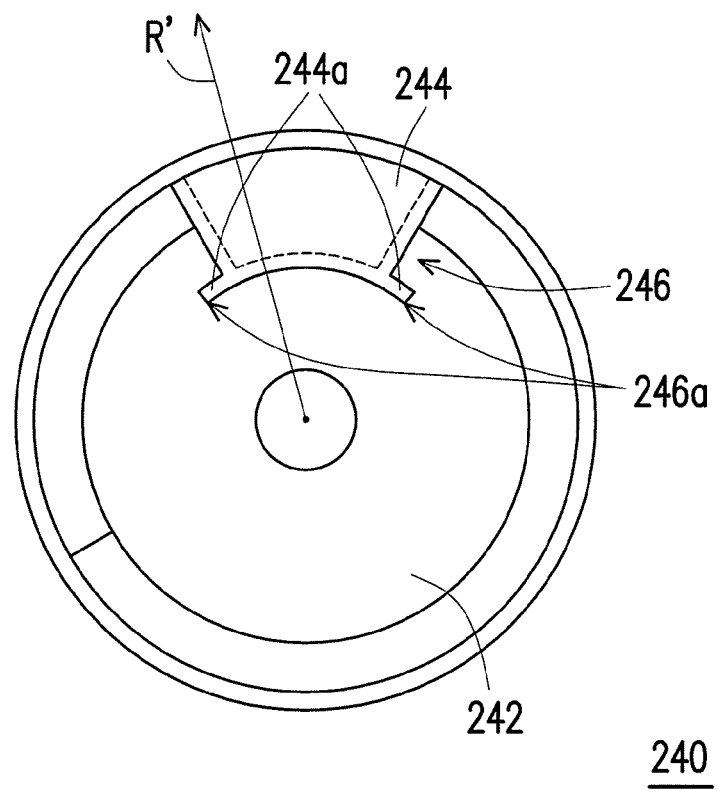
FIG. 5 is a side view of a part of components of a wavelength conversion device according to another embodiment of the invention.

In the wavelength conversion device 240 of FIG. 5, configuration and functions of the main body 242 and the transparent element 244 are similar to configuration and functions of the main body 142 and the transparent element 144 of FIG. 2, and details thereof are not repeated. A difference between the wavelength conversion device 240 and the wavelength conversion device 140 is: in the wavelength conversion device 140, the bump 144a of the transparent element 144 is stuck into the indentation 146a of the containing recess portion 146 and there is no structure capable of preventing the transparent element 144 from moving away from the main body 142 along the radial direction R of the main body 142; in the wavelength conversion device 240, the bumps 244a (two bumps, for example, are illustrated) of the transparent element 244 have structures sticking into the indentations 246a (two indentations, for example, are illustrated) of the containing recess portion 246 to prevent the transparent element 244 from moving away from the main body 242 along the radial direction R' of the main body 242.

Figure 6:
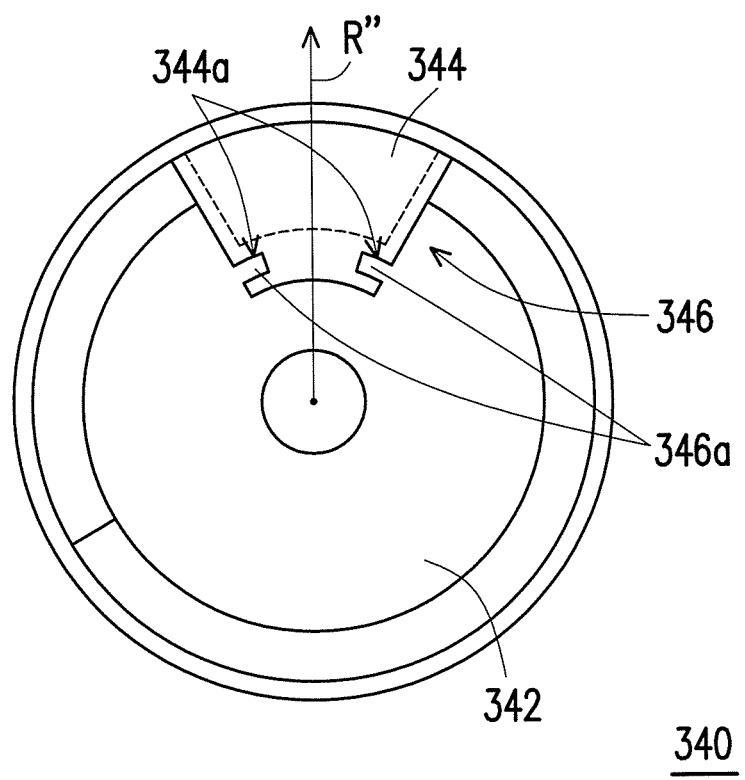
FIG. 6 is a side view of a part of components of a wavelength conversion device according to another embodiment of the invention.

In the wavelength conversion device 340 of FIG. 6, configuration and functions of the main body 342 and the transparent element 344 are similar to configuration and functions of the main body 242 and the transparent element 244 of FIG. 5, and details thereof are not repeated. A difference between the wavelength conversion device 340 and the wavelength conversion device 240 is: in the wavelength conversion device 340, the bumps 346a (two bumps, for example, are illustrated) are formed on the containing recess portion 346 and not formed on the transparent element 344, and the indentations 344a (two indentations, for example, are illustrated) are formed on the transparent element 344 and not formed on the containing recess portion 346; similarly, the bumps 346 are stuck into the indentations 344a of the transparent element 344 to prevent the transparent element 344 from moving away from the main body 342 along the radial direction R" of the main body 342.

In summary, the embodiments of the invention have at least one following advantages. In the embodiments of the invention, the transparent element is disposed in the closed slot encircled by the containing recess portion and the stop portion, such that the closed slot is covered by the transparent element to avoid generating the airborne noise when the main body is operated. Since the transparent element is disposed in the closed slot, a problem of asymmetric structure caused by configuring an open slot or closed slot on the wavelength conversion device is mitigated, and it is unnecessary to add another open slot or closed slot on the main body to resolve the problem of the asymmetric structure, such that fabrication cost of the wavelength conversion device is decreased and it is avoided to form excessive open slots or closed slots on the main body to aggravate the airborne noise. Moreover, since the main body of the wavelength conversion device is unnecessary to additionally add the open slot or closed slot, the main body has a larger heat dissipation area, and the wavelength conversion device accordingly has good heat dissipation efficiency. In addition, the transparent element of the embodiment of the invention is inlaid to the closed slot through an interference manner and the stop portion stops the transparent element along a radial direction of the main body, such that the transparent element is prevented from separating away from the main body along the radial direction along with movement of the main body, and the whole structure of the wavelength conversion device is more stable.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion device, comprising:
    a main body, having at least one wavelength conversion region, a containing recess portion, and a stop portion, wherein the containing recess portion and the stop portion encircle a closed slot; and
    a transparent element, disposed in the closed slot to construct a light penetration region, wherein the transparent element is free from an opening in an axial direction, and the stop portion stops the transparent element along a radial direction of the main body, wherein the axial direction is perpendicular to the radial direction.

2. The wavelength conversion device as claimed in claim 1, wherein a distance between an outer periphery of the stop portion and a center of the main body along the radial direction is greater than a distance between an outer periphery of the wavelength conversion region and the center of the main body along the radial direction.

3. The wavelength conversion device as claimed in claim 1, wherein one of the containing recess portion and the transparent element has at least one indentation, and another one of the containing recess portion and the transparent element has at least one bump, the bump is stuck into the indentation to fix a relative position of the transparent element and the main body.

4. The wavelength conversion device as claimed in claim 3, wherein the bump is stuck into the indentation to prevent the transparent element from moving away from the main body along the radial direction.

5. The wavelength conversion device as claimed in claim 1, wherein the main body has a retaining structure, the retaining structure is located in the containing recess portion, and the transparent element leans against the retaining structure to prevent the transparent element from moving away from the main body along the axial direction of the main body.

6. The wavelength conversion device as claimed in claim 5, further comprising an assembly, wherein the assembly is disposed on the main body, and the transparent element is clamped between the assembly and the retaining structure.

7. The wavelength conversion device as claimed in claim 5, wherein the retaining structure comprises at least one flange, and the flange is connected to at least one inner wall of the containing recess portion.

8. The wavelength conversion device as claimed in claim 5, wherein the retaining structure comprises a plate, and the plate is connected between a plurality of the inner walls of the containing recess portion.

9. The wavelength conversion device as claimed in claim 5, wherein a first portion of the transparent element leans against the retaining structure, and a second portion of the transparent element is exposed by the retaining structure to construct the light penetration region.

10. The wavelength conversion device as claimed in claim 5, wherein a sum of thickness of the retaining structure and the transparent element along the axial direction is equal to a thickness of the main body along the axial direction.

11. A projector, comprising:
a light source, adapted to provide an illumination beam;
a light valve, located on a transmission path of the illumination beam, and adapted to convert the illumination beam into an image beam;
a lens, located on a transmission path of the image beam, and adapted to convert the image beam into a projection beam; and
a wavelength conversion device, disposed on the transmission path of the illumination beam, and comprising:
a main body, having at least one wavelength conversion region, a containing recess portion, and a stop portion, wherein the containing recess portion and the stop portion encircle a closed slot; and
a transparent element, disposed in the closed slot to construct a light penetration region, wherein the main body is adapted to move to sequentially move the wavelength conversion region and the light penetration region to the transmission path of the illumination beam, the transparent element is free from an opening in an axial direction, and the stop portion stops the transparent element along a radial direction of the main body, wherein the axial direction is perpendicular to the radial direction.

12. The projector as claimed in claim 11, wherein a distance between an outer periphery of the stop portion and a center of the main body along the radial direction is greater than a distance between an outer periphery of the wavelength conversion region and the center of the main body along the radial direction.

13. The projector as claimed in claim 11, wherein one of the containing recess portion and the transparent element has at least one indentation, and another one of the containing recess portion and the transparent element has at least one bump, the bump is stuck into the indentation to fix a relative position of the transparent element and the main body.

14. The projector as claimed in claim 13, wherein the bump is stuck into the indentation to prevent the transparent element from moving away from the main body along the radial direction.

15. The projector as claimed in claim 11, wherein the main body has a retaining structure, the retaining structure is located in the containing recess portion, and the transparent element leans against the retaining structure to prevent the transparent element from moving away from the main body along the axial direction of the main body.

16. The projector as claimed in claim 15, wherein the wavelength conversion device further comprises an assembly, the assembly is disposed on the main body, and the transparent element is clamped between the assembly and the retaining structure.

17. The projector as claimed in claim 15, wherein the retaining structure comprises at least one flange, and the flange is connected to at least one inner wall of the containing recess portion.

18. The projector as claimed in claim 15, wherein the retaining structure comprises a plate, and the plate is connected between a plurality of the inner walls of the containing recess portion.

19. The projector as claimed in claim 15, wherein a first portion of the transparent element leans against the retaining structure, and a second portion of the transparent element is exposed by the retaining structure to construct the light penetration region.

20. The projector as claimed in claim 15, wherein a sum of thickness of the retaining structure and the transparent element along the axial direction is equal to a thickness of the main body along the axial direction.

* * * * *